United States Patent [19]
Ardakani et al.

[11] Patent Number: 6,149,840
[45] Date of Patent: Nov. 21, 2000

[54] ELECTRICALLY CONDUCTIVE POLYMERIC MATERIALS AND USE THEREOF

[75] Inventors: Ali Afzali Ardakani, Yorktown Heights; Marie Angelopoulos, Briarcliff Manor, both of N.Y.; Vincent Albert Bourgault, Rochester, Minn.; Liam David Comerford, Carmel, N.Y.; Michael Wayne Mirre, Lexington, Ky.; Steven Earle Molis, Yorktown Heights; Ravi Saraf, Croton-on-Hudson, both of N.Y.; Jane Margaret Shaw, Ridgefield; Peter Joseph Spellane, Greenwich, both of Conn.; Niranjan Mohanlal Patel, Peekskill, N.Y.

[73] Assignee: International Business Machines Corporation, Armonk, N.Y.

[21] Appl. No.: 08/838,296

[22] Filed: Sep. 29, 1997

Related U.S. Application Data

[62] Division of application No. 08/118,475, Sep. 7, 1993, abandoned, which is a continuation of application No. 07/746,386, Aug. 16, 1991, abandoned.

[51] Int. Cl.[7] .............................. H01B 1/00; C08G 73/06
[52] U.S. Cl. ........................................... 252/500; 528/423
[58] Field of Search ............................................. 252/500

[56] References Cited

U.S. PATENT DOCUMENTS

| | | | |
|---|---|---|---|
| 4,851,487 | 7/1989 | Yaniger et al. | 525/540 |
| 4,855,361 | 8/1989 | Yaniger et al. | 525/436 |
| 4,929,388 | 5/1990 | Wessling | 252/500 |
| 5,198,153 | 3/1993 | Angelopoulos et al. | 252/500 |
| 5,217,649 | 6/1993 | Kulkarni et al. | 252/500 |
| 5,254,633 | 10/1993 | Han et al. | 525/327.4 |

*Primary Examiner*—Yogendra Gupta
*Assistant Examiner*—John M. Petruncio
*Attorney, Agent, or Firm*—Thomas A. Beck

[57] ABSTRACT

A polymer blend composition, capable of being made electrically conductive by application of heat having an electrically conductive upon doping polymer in undoped form; the undoped polymer is selected from the group consisting of substituted and unsubstituted polyparaphenylenevinylenes, polyanilines, polyazines, polythiophenes, poly-p-phenylene sulfides, polyfuranes, polyselenophenes, polyacetylenes filtered from soluble precursors and combinations and blends thereof, compounded and blended at a molecular scale with a dielectric polymer; wherein the dielectric polymer is selected from the group consisting of interpolymers of acrylonitrile-butadiene-styrene, acetal acrylic liquid crystal polymers, polybutylene terephthalate, polycarbonate, polyester, polyetherimide, polyethersulfone, polyethylene, polyethylene terephthalate, polyphenylene oxide, polyphenylene sulfide, polypropylene, polystyrene, polyurethane, polyvinychloride, styrene-acrylonitrile copolymer, fluoropolymers, nylon polyesters, and thermoplastic elastomers, and a thermally deblockable dopant selected from the group consisting of triflates, tosylates and borates, the electrically conductive upon doping polymer having enhanced solubility in undoped form with said dielectric polymer to form a compatible molecularly mixed blend in solution; doping of the polymer occurs only after exposure to heat.

5 Claims, 9 Drawing Sheets

ELECTRICALLY CONDUCTIVE POLYMERIC MATERIALS AND USE THEREOF

This application is a division of application Ser. No. 08/118,475, filed Sep. 7, 1993, abandoned, which is a continuation of application Ser. No. 07/746,386 filed Aug. 16, 1991, now abandoned.

FIELD OF THE INVENTION

The present invention relates to electrically conductive polymer blend compositions comprising a non-conducting polymeric component and an electrically conducting polymeric component and specific applications to which said blend compositions can be put.

In accordance with the present invention, the electrically conducting polymeric component noted above possesses such conducting property because it is doped, for example by protonation. Unexpectedly, such doped electrically conductive polymer which is generally insoluble in a polymer blend, can be substantially uniformly dispersed in the non-conducting (dielectric) polymer component to result in an electrically conductive blend that can be formed into an article suitable for commercial use.

In one embodiment of the invention, the non-conducting or non doped polymer is blended with a dielectric polymer and a precursor doping reagent which as noted above is a protonating agent in this instance. The resulting three component solution may be processed into film form or into a three dimensional shaped article or body by such conventional methods as molding, spin coating or other convenient processes. The resulting film or body is subjected to an energy input such as heat, causing the protonating agent to release a proton which interacts with the non protonated polymer to make it conducting. The result is that an electrically conductive shaped article can be formed from the blend in one step.

Because the conducting or doped form of the polymer is not soluble, it cannot be mixed directly with the dielectric polymer. The undoped polymer may be mixed with the dielectric material to obtain a blend which can then be externally doped by an appropriate doping reagent, such as a protonic acid. However, this process is neither convenient nor efficient. The method described herein allows a conducting blend to be formed directly in one step.

In another embodiment of the present invention, the doping agent is the dielectric polymer (hereinafter referred to as the "polydopant") which provides, for example, the proton to protonate the other polymer in the blend to the conducting state.

One practical application of the compositions of the present invention is the electrostatic or electrochemical deposition of paint onto a matrix composition formed into a shaped article prepared from or containing the blends mentioned above.

Another practical application of the invention is directed to tethers for electronic notebook computers. The tethers are made of compositions disclosed hereinafter.

More particularly, the embodiments of the present invention comprise electrically conductive polymeric materials being selected from the group consisting of substituted and unsubstituted polyparaphenylenevinylenes, polyanilines, polyazines, polythiophenes, poly-p-phenylene sulfides, polyfuranes, polypyrroles, polyselenophene, polyacetylenes formed from soluble precursors and combinations thereof and blends thereof in admixture with other polymers including engineering resins and/or polydopants.

BACKGROUND OF THE INVENTION

Electrically conducting organic polymers have been of scientific and technological interest since the late 1970's. These relatively new materials exhibit the electronic and magnetic properties characteristic of metals while retaining the physical and mechanical properties associated with conventional organic polymers. Technological application of these polymers are beginning to emerge.

Today, conductive polymers and composites such as mentioned above have a broad range of applications including their use as materials for carriers of electrically sensitive devices which prevent electrostatic charge (ESC) which may attract airborne particles on critical surfaces and electrostatic discharge (ESD) which may cause device malfunction.

In addition, conducting polymers can be used as machine covers for electronic equipment which prevent the ingress or egress of electromagnetic signals in order to meet the guidelines established by the FCC as to the accepted levels of unwanted electrical noise.

The materials currently in use are rendered conductive through the use of conductive fillers like metal, carbon particles or chemicals such as ionic salts. The problems associated with these materials include high cost, sloughing of the filler, dependency on environmental conditions, and a very high surface resistance.

Polyanilines are known to be a class of soluble, processable electrically conducting organic polymers. This family of polymers displays a range of solubilities in organic and aqueous acid solutions.

Polyanilines are rendered conducting by treatment with cationic reagents (Lewis acids), most commonly protonic acids. Also the polyaniline can be doped by taking the non-conducting form of the polymer and amine triflate salts (which thermally generate acid) and mildly heating them together in the form of a film or in solution. An example of this method is disclosed in U.S. Pat. No. 5,198,153. Although polyaniline is very inexpensive to produce, some of its physical properties such as the impact strength, tensile strength, etc., may limit the full scope of its uses.

There is specific prior art that discloses blending polyaniline with a dopant. U.S. Pat. No. 4,851,487 discloses the doping reaction of polyaniline with anhydrides and the uses of polyimide oligomers having anhydride terminated functionality (R—CO—O—CO—) as dopants.

U.S. Pat. No. 4,855,361 discloses an anhydride doped polyaniline blended with polyimides to form a non-compatible polymeric composite.

The techniques disclosed in these references are completely different from the present invention. The present invention uses polydopants, for example, polyimide precursors such as the polyamic acid (—COOH) form (with a high molecular weight as made) as direct dopants for the polyaniline to obtain conducting blends of the two polymers in one step. In the case of polyamic acid, the polyaniline becomes protonated by the polyamic acid. In the prior art, an anhydride reacted polyaniline is blended with polyimides.

By contrast, in the present invention, the conductive blend is obtained in a single step due to the interaction between the polydopant (polyamic acid) and the conducting polymer leading to a compatible conducting polymer blend. The resultant blend in the present invention has dispersion at a molecular scale as opposed to the prior art wherein the dispersion is at a much coarser scale.

The references cited above do not form a conducting complex or blend with the polyamic acid but rather the polyaniline is reacted with anhydrides first to obtain a product, and thereafter, this product is blended with another polyimide. There is no polyamic acid doping disclosed in the references.

The present invention uses polydopants, which as noted above for the purpose of the present invention, are Lewis acid polymers. Examples of such polydopants are: polyacrylic acid, polysulfonic acid, cellulose sulfonic acid, polyamic acid, photosensitive polyamic acid, polyphosphoric acid, acid chloride (—COCl) containing polymers and sulfonyl chloride (—$SO_2Cl$) containing polymers.

This is exemplary and should not be construed as limiting the scope of the polydopants.

The advantages of the use of such materials are that no external corrosive monomeric or oligomeric dopants are necessary; there is high thermal and electrical stability due to the polymeric counteranion; and there is enhanced processability.

It is important to note that because of the interaction of the two polymers as stated above, compatible molecularly mixed blends are formed wherein there is no phase separation. Finally, the solution gels over time which allows the formation of highdraw ratio fibers.

SUMMARY OF THE INVENTION

A broad aspect of this invention is a blend of polymer pairs which, in appropriate composition range and appropriate doping reaction form an intrinsically electrically conductive blend.

In a first embodiment of the present invention, electrically conductive polymers in undoped form are blended with polymers that act as a dopant for the conducting polymer.

More particularly, in this embodiment, polydopants are added to undoped conductive polymers that when blended, form a salt. The two polymers strongly interact at multiple points along the length of the polymer chain resulting in a compatible polymer blend.

In the second embodiment of the present invention the nonconducting or undoped polymer is blended with a dielectric polymer and a precursor doping reagent by conventional methods.

The dielectric polymer in this instance is a non dopant for the conducting polymer in contrast to the first embodiment disclosed above and may conveniently be an engineering resin. The precursor dopants are generally deblockable Lewis acids.

Unique applications of the above embodiments significantly improve conventional methods presently employed. For example, as a result of using the embodiments described above, films, shaped articles, fibers or bodies can be formed that are capable of being painted using electrostatic/electrochemical processes. Including in this embodiment is applying a conducting polymer to the surface of a non conducting shaped article.

Another application of the embodiments described above is the use of the compositions in the construction of styli for resistive film digitizers used in handwriting capture applications such as notebook computers.

These and other objects, features and advantages will be apparent from the following more particular description of the preferred embodiments and the figures appended thereto.

DETAILED DESCRIPTION OF THE PREFERRED EMBODIMENTS

Figure 1:
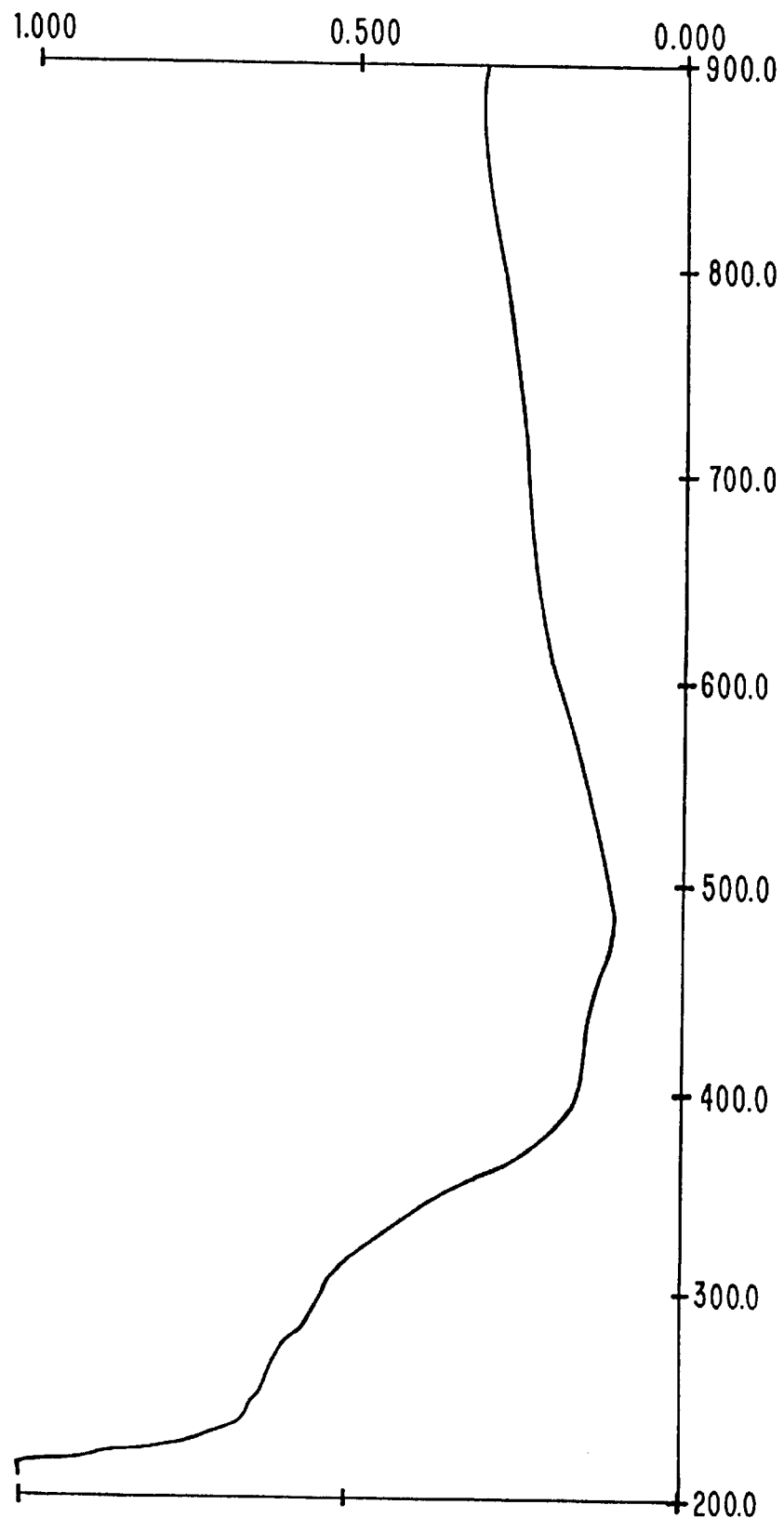
FIG. 1 is a UV visible spectrum of polyamic acid and polyaniline at molar ratios of 1:0.5.

In the first embodiment of the present invention, the doping agent is the dielectric polymer containing Lewis acid functionality (polydopant) which reacts with the undoped conducting polymer to form the conducting state of the polymer.

Another particularly important aspect of this embodiment is the mixing of the dielectric and conducting polymer at the molecular scale resulting in a molecular composite. The low modulus/low strength properties of the conducting polymer are reinforced and enhanced by the high modulus high strength properties of the polydopant in the molecular composite. This is a significant improvement over past processes where failure of molecular compatibility in the polymer blends occurs due to molecular phase separation of the conductive and dielectric polymers resulting in aggregation of the conductive and dielectric regions.

Furthermore, this embodiment comprises a novel method of achieving an intercalated molecular blend of two polymers, where the two polymers may not have to be compatible, and one of them may be a rigid polymer. The flexible conducting polymer complexes with the flexible dopant polymer forming the intercalated molecular blend. On heating, the flexible dopant polymer may lose the chemical functionality for complexation leading to a more rigid polymer, however, the molecular demixing is prevented due to high viscosities leading to low diffusivities in the condensed state resulting in a molecularly mixed dispersion. This molecularly mixed dispersion is referred to as a "frustrated blend." The resultant structure is a true reinforced molecular composite.

The ratio of the components in the blend will vary depending upon the desired properties needed to accomplish the objective. The following polydopants may conveniently be used in this embodiment of the present invention; illustrative of, but not limited to, the operative dopants in the present invention are: polyacrylic acid, polysulfonic acid, cellulose sulfonic acid, polyamic acid, photosensitive polyamic acid, polyphosphoric acid, acid chloride (—COCl) containing polymers and sulfonyl chloride (—$SO_2$Cl) containing polymers.

The second embodiment of the present invention is a three component system comprising a conductive polymer in the undoped form that is compounded or blended with a dielectric polymer and a thermally deblockable dopant.

The thermally deblockable dopant additive allows the compounding of the conductive polymer and the dielectric polymer directly in solution state because the conducting polymer has enhanced solubility in the undoped form and the doping only occurs upon exposure to heat. Conducting polymers in the doped form cannot be directly blended with the dielectric polymer in solution because the conducting polymer in the doped form does not have appreciable solubility. Upon heating, the 3-component system, a conductive blend is obtained. The above solutions can be cast into conductive films or fibers having a variety of uses.

The three component system can also be processed in the solid state. For example, the materials can be thermally formed into any number of configurations using various molding techniques. In either method, no external dopants or fillers are necessary to render the material conducting.

In either of the processes noted above, the degree of conductivity is dependent upon the ratio of the conducting polymer to the other resin or resins, and the degree of doping in the conductive polymer. The ability to accurately control the resulting conductivity of the blends allows them to be used in applications requiring very little conductivity (ESC) and (ESD) to very high conductivity applications such as in (electromagnetic interference shielding) (EMI).

Specific physical properties of the resulting materials can be obtained through traditional resin fillers. These optionally include glass (fibers, spheres, etc.) and minerals (platelets, fibers, etc.). The addition of these materials is common in the resin manufacturing industry.

The following dielectric polymers may conveniently be used in this embodiment of the present invention. There are many different grades of these materials. They can vary by molecular weight and the types of additives compounded into them. Some of these resins can be blended together creating additional resin families. The useful resins are: ABS (acrylonitrile butadiene styrene), acetal acrylic LCP's (liquid crystal polymers), PBT (polybutylene terephthalate), polycarbonate, polyester, polyetherimide, polyethersulfone, polyethylene, high density and low density, PET (polyethylene terephthalate), PPO (polyphenylene oxide), PPS (polyphenylene sulfide), polypropylene, polystyrene, polyurethane, PVC [poly (vinyl chloride)], SAN (styrene-acrylonitrile copolymer, fluoropolymers, nylon polyesters and TPE (thermoplastic elastomer). This list is exemplary and not limiting.

Examples of thermally deblockable dopants to be used in accordance with the present invention includes the triflates, tosylates and borates of the following list: $CF_3SO_3H$ $NC_5H_5$, $CF_3SO_3H\cdot NH_3$, $CF_3SO_3H$ $CH_3NHC$, $CF_3SO_3H\cdot(CH_3)_3N$, $CF_3SO_3H\cdot C_2H_5NH_2$, $CF_3SO_3H\cdot(C_2H_5)_2NH$, $CF_3SO_3H\cdot(C_2H_5)_3N$, $CF_3S_3H\cdot(i-C_3H_7)_2NH$, $CF_3SO_3H\cdot(i-C_3H_7)_2N(C_2H_5)$, $CF_3SO_3H\cdot(i-C_3H_7)_2N(C_2H_4OH)$, $CF_3SO_3H\cdot H_2N(C_2H_4OH)$, $CF_3SO_3H\cdot HNC_4H_8O$, $CF_3SO_3H\cdot H_2NC(CH_3)_2CH_2OH$, $CF_3SO_3H\cdot HNC_5H_{10}$, $CF_3SO_3H\cdot HN(C_2H_4OH)_2$, $BF_3C_2H_5NH_2$, $CF_3SO_3(CH_3)_4N$, $H_3C(C_6H_4)SO_3H$. This list is exemplary and not limiting.

The temperature at which the doping occurs inducing conductivity is a function of the chemical nature of the precursor dopant. Therefore, by selectively tailoring the chemical structure of the dopant, the doping process can be induced at a variety of temperatures (preferably occurring between 80° C. and 250° C.).

As noted above, suitable conductive polymers used in embodiments one and two of the present invention are polymeric materials selected from the group consisting of substituted and unsubstituted polyparaphenylenevinylenes, polyanilines, polyazines, polythiophenes, poly-p-phenylene sulfides, polyfurans, polypyrroles, polyselenophenes, polyacetylenes formed from soluble precursors and combinations thereof and blends thereof with other polymers.

Among the aforementioned conducting polymers, it has been determined that polyaniline is a preferred polymer to be used.

For the purpose of this invention, the term "polyaniline" is a substituted or unsubstituted polyaniline having the following general formula:

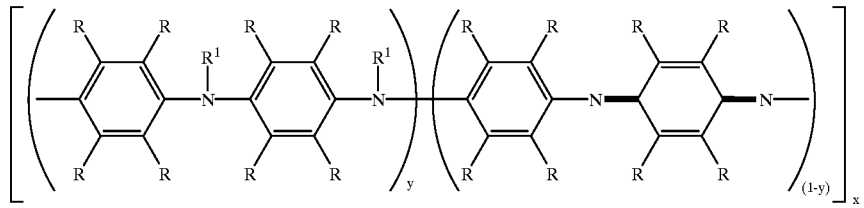

wherein each R can be H or any organic or inorganic radical; each R can be the same or different; wherein each $R_1$ can be H or any organic or inorganic radical, each $R_1$ can be the same or different; $x \geq 1$; preferably $X \geq 2$ and y has a value from 0 to 1. Examples of organic radicals are alkyl or aryl radicals. Examples of inorganic radicals are Si and Ge. This list is exemplary only and not limiting. The most preferred embodiment is emeraldine base form of the polyaniline wherein y has a value of 0.5.

If the polyaniline base is exposed to a cationic species QA, for example a protic acid wherein Q is hydrogen, the nitrogen atoms of the imine part of the polymer become substituted with the Q cation to form an emeraldine salt as shown in the following formula:

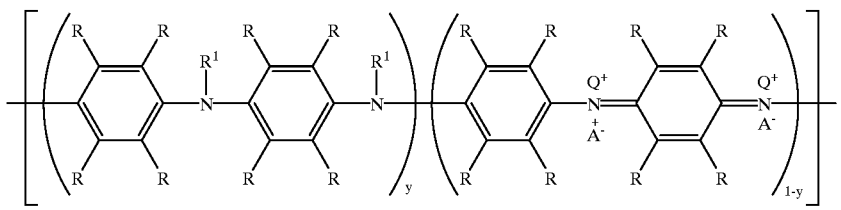

When a protic acid (HA) is used to dope the polyaniline, the nitrogen atoms of the imine part of the polyaniline are protonated. The emeraldine base form is greatly stabilized by resonance effects as is shown in the following sequence of compounds:

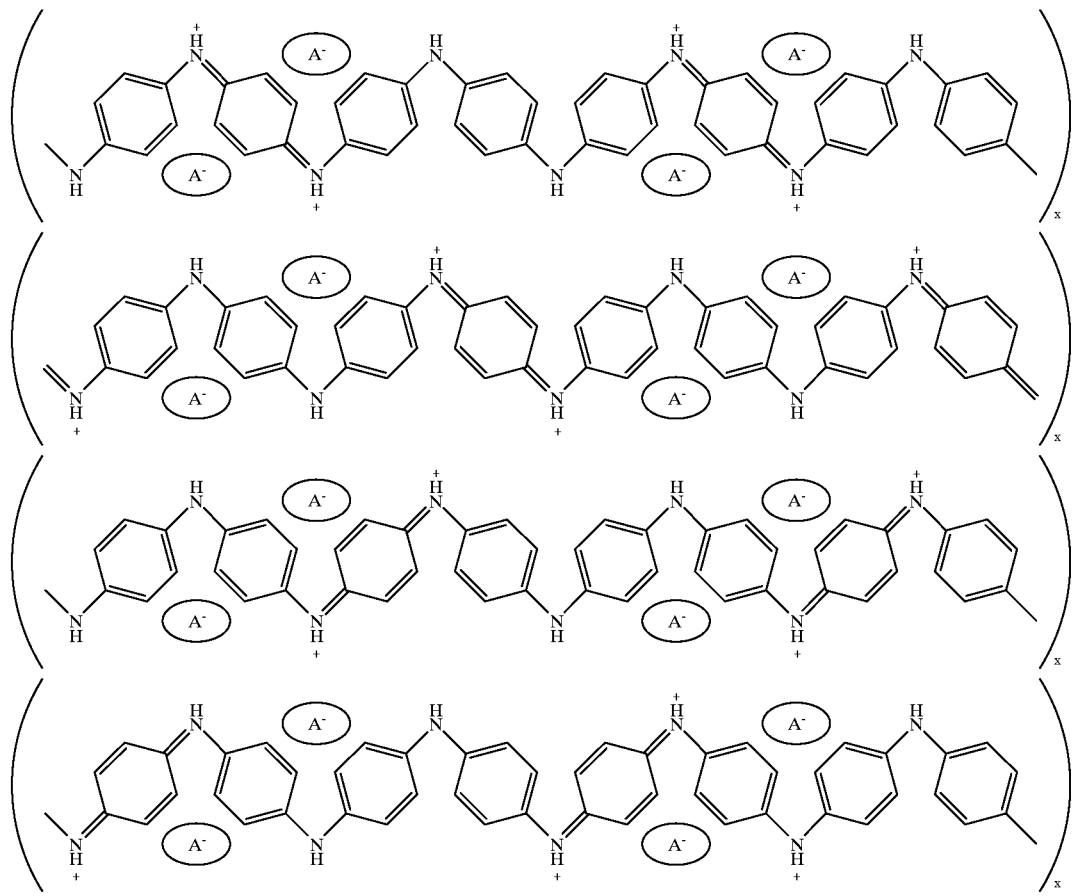

The charges distribute through the nitrogen atoms and aromatic rings making the imine and amine nitrogens indistinguishable. For the sake of simplicity the above sequence of equations was shown with a protonic acid HA. However, a cationic species represented by QA can also be used whereas Q is a cation selected from organic and inorganic cations, for example, an alkyl group or a metal, being most preferably H.

The emeraldine base form of polyaniline is soluble in various organic solvents and in various aqueous acid solutions. Examples of organic solvents are dimethylsulfoxide (DMSO), dimthylformamide (DMF) and N-methylpyrrolidinone (NMP). The aforementioned solvents are presented herein by way of illustration only and should not be construed as limited to the solvents disclosed. Examples of aqueous acid solutions are about 80% acetic acid and 60–88% formic acid. The examples also are illustrative and not limiting. Substituted polyanilines are also soluble in such solvents as chloroform and methylene chloride.

The blends of the present invention may be utilized in a variety of commercial applications, where there is a requirement for conductivity. For example, it is well known that electrostatic or electrochemical paint processes are efficient methods of painting metal surfaces such as found in automobile bodies. These methods do not require an over spray and allow for good coating of inner surfaces. An electrical potential is applied to the car body as it is immersed in an electrolytic paint solution. Electrically charged paint molecules are attracted to or react with the metal surface of the automobile body. This process, however, can only be used for automobile bodies which are composed of conducting materials, e.g. steel. It cannot be used, for example, on nonconducting polymer based/fiber glass automobiles.

In accordance with the invention, organic electrically conducting polymers are used in constructing automobile bodies to allow the electrostatic/electrochemical paint process to be employed. Polyaniline in particular is one example of the various conducting polymers detailed above which may be used in such an application. The polyaniline may be applied in several ways. One convenient method is to apply a polyaniline coat on to the polymer of a composite based auto part or, for example, an appliance. This polyaniline coat may be solution deposited, vapor deposited, electrochemically deposited, or adsorbed.

The conductive polymers of the invention may be blended in either of methods disclosed above with a structural polymer or composite used in constructing the auto part. In addition, fibers made from the conducting polyaniline may also be used to blend in with the auto part material.

The incorporation of a conducting polymer into the structural material allows the electrostatic or electrochemical painting process to be employed in coating polymeric or composite automobile parts. This process may also be used in any application in which a controlled uniform thickness, non-solvent involved coating is required.

Another application of the conductive blends comprising the composition of the present invention is for constructing styli digitizers used in handwriting capture applications such as notebook computers. The styli must satisfy requirements from both the system user and the system designer. From the system standpoint, the potential needed to drive about 3 mA into the typical film has to be kept at safe levels. This means that the stylus should contribute less than 200 ohms to the net resistance. This resistance can be divided in any convenient manner between the bulk of the stylus point material and the contact between that material and the film.

The user requirements for styli are more qualitative. The material must take and hold a point so that the user sees and feels a thin writing instrument, not a bulky instrument such as a crayon. The drag on the tip of the instrument must be in the range experienced with writing instruments on paper. The aforementioned requirements support transfer of the skill of handwriting into the computer environment so the recognition software gets characters that are made by rote.

In summation, in both the first and second embodiments of the present invention, electrically conducting composites are obtained using a simple, inexpensive, one-step procedure. A significant advantage that the resulting materials possess over traditional conductive composites is high surface conductivity. In applications where either two or more conductive polymer composite parts, or a conductive part and a metal part must have a conductive path between them, some means of creating that path (ground straps, etc.) must be provided. The relatively high surface conductivity of the polyaniline blends for example, generally eliminates the need for the additional conductive path.

The problems solved by the present invention include: eliminating the high cost of conductive polymer composites (fillers, etc.); sloughing of conductive fillers associated with conductive polymer composites; high surface resistivity of conductive polymer composites; dependency on environmental conditions for surface resistivity of chemically activated conductive polymer composites and sensitivity to processing conditions that conductive composite materials have (injection speed, screw rotation speed, processing temperature, etc.).

In addition, the first embodiment of the present invention also possesses the following novel features: no additional dopant is required as opposed to the general family of conducting polymers where a corrosive dopant is added to impart electrical conduction; the formation of a conductive "gel" in dilute solution which is useful to achieve high draw ratio fibers, (among many other applications); the in-situ reinforcement of the polymer due to the dopant polymer and improved thermal and electrical stability compared with the corresponding pure conducting polymer with a corrosive, low molecular weight dopant; the formation of an intercalated miscible molecular blend of two polymers.

In order to demonstrate the invention in greater detail, the following examples are included.

EXAMPLE 1

Figure 2:
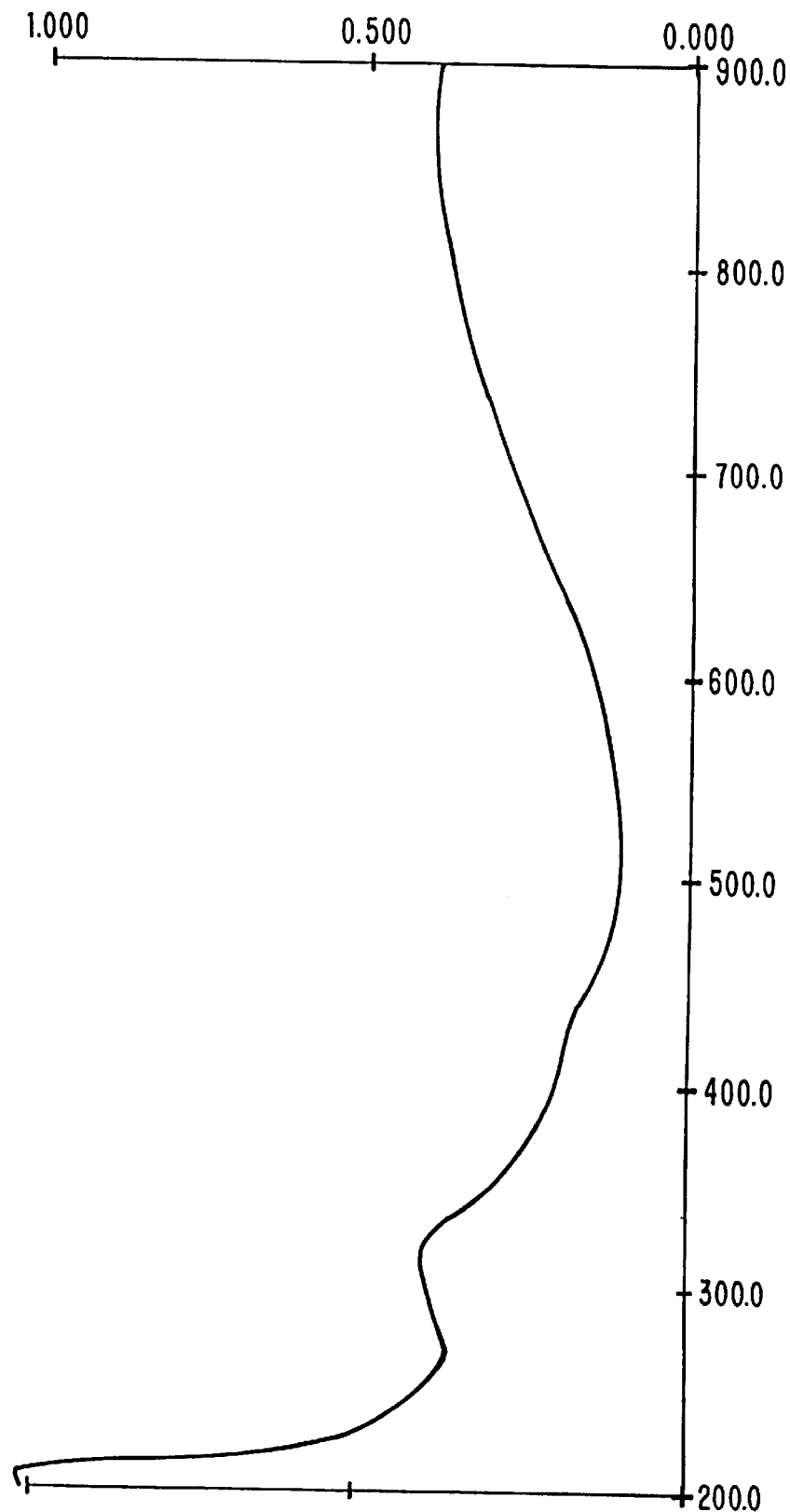
FIG. 2 is a UV visible spectrum of polyaniline doped with HCl.
Figure 4:
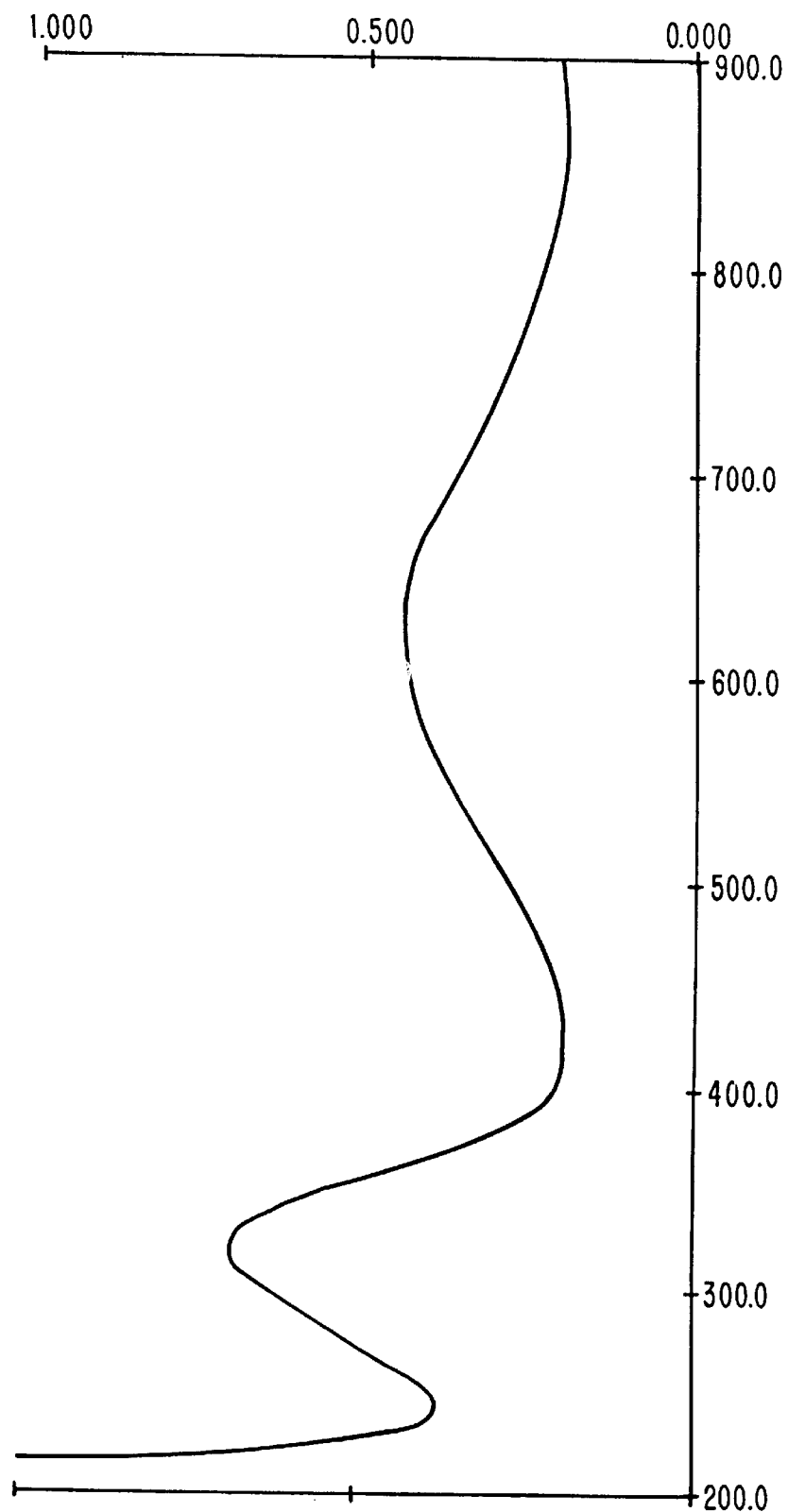
FIG. 4 is the UV visible spectrum of the non-conducting form of polyaniline.

Polymer A: polyaniline (in base form) (PANI) and polymer B: [polyamic acid pyromellitic dianhydride (PMDA) oxydianiline (ODA) (PMDA-ODA)] (PAA) were dissolved in NMP to form a 0.5:1.0 molar ratio of A:B polymer. A film on quartz and teflon substrate was cast. The UV spectrum of PANI/PAA (FIG. 1) reveals two absorption peaks characteristic of the conducting or doped form of polyaniline; one at 440 nm (2.7 ev) and also one between −800 and 900 nm (1.5 ev). These two peaks are also found in the spectrum of the conducting polyaniline (FIG. 2) in which the dopant is HCl. The two peaks are attributed to transitions from the valence band to the polaron conduction band. It should be noted that in the spectrum of PANI/PAA there is a residual peak at 610 nm (2 eV) which is characteristic of the non-conducting or undoped form of PANI (FIG. 4). This indicates that complete doping has not occurred as expected since the blend was 0.5:1.0 molar ratio.

Figure 3:
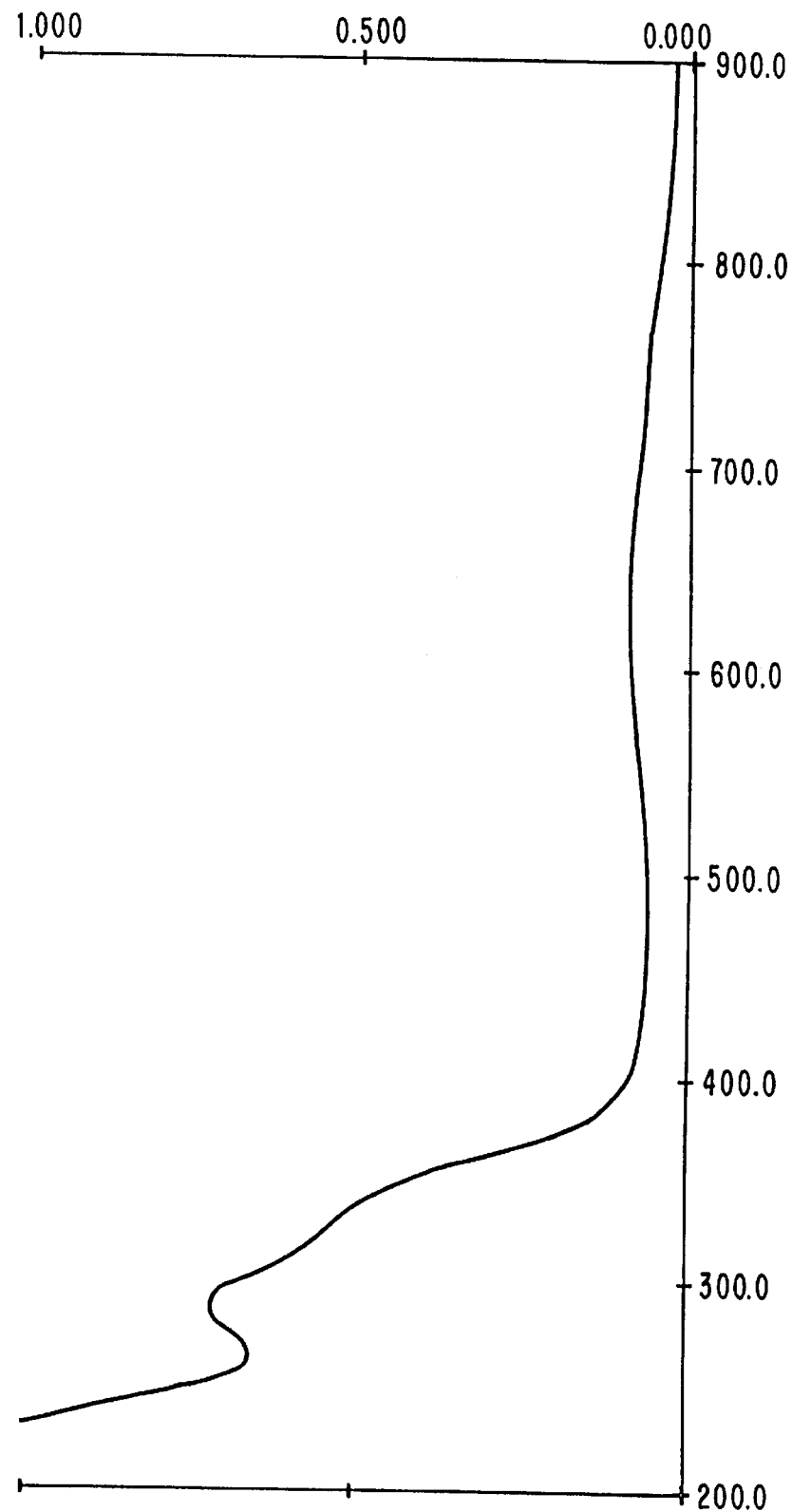
FIG. 3 is the UV visible spectrum of polyamic acid and polyaniline at a molar ratio of 1:0.5 after imidization of polyamic acid at 225° C.

When the PANI/PAA is cured at 225° C., the UV spectrum (FIG. 3) shows that the peaks at 2.7 ev and 1.5 ev characteristic of the conducting form of PANI are gone. The peak at 2eV is present which is characteristic of the non conductive form of the polymer. This observation is consistent with loss of conductivity upon curing of the polyamic acid which converts the amic acid groups to imides.

The doping of PANI with PAA can also be observed visually. The initial PANI/PAA dry film is green (characteristic of conducting PANI) and upon curing the PAA, the PANI/PAA film turns blue (characteristic of insulating PANI).

Figure 5:
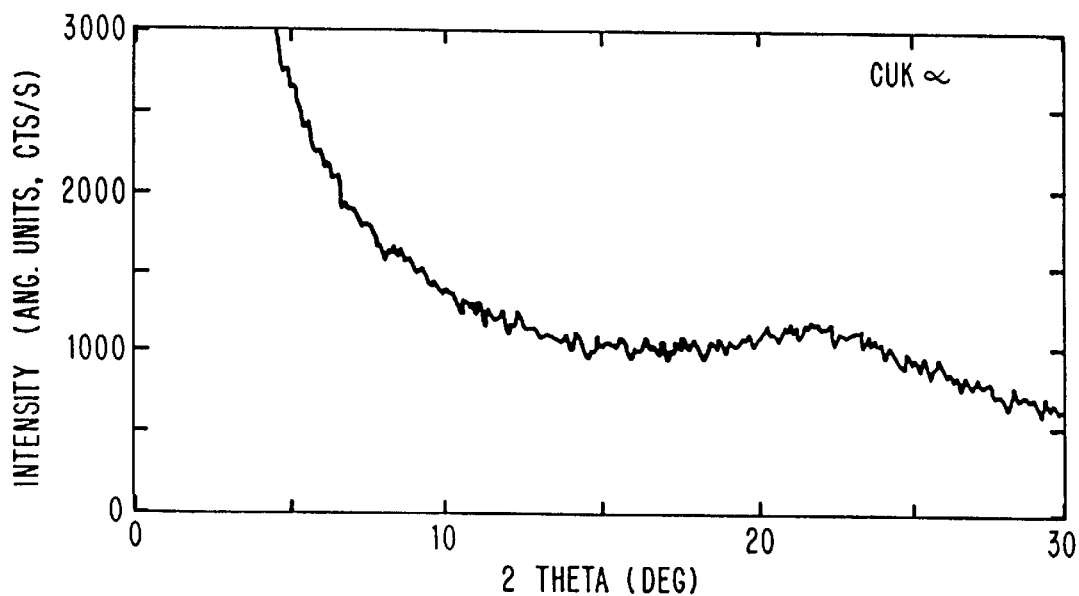
FIG. 5 is the wide angle X-ray spectrum of polyaniline in the base form using $CuK^\alpha$ radiation.
Figure 6:
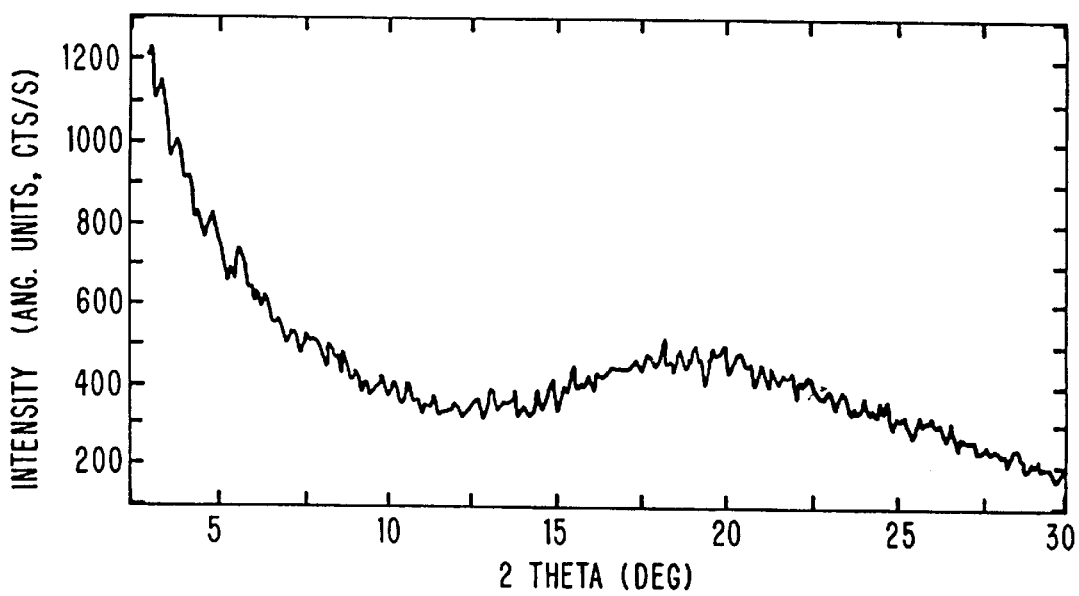
FIG. 6 is the wide angle X-ray spectrum of polyamic acid, polyaniline blend in a molar ratio of 1:05 using $CuK^\alpha$ radiation.
Figure 7:
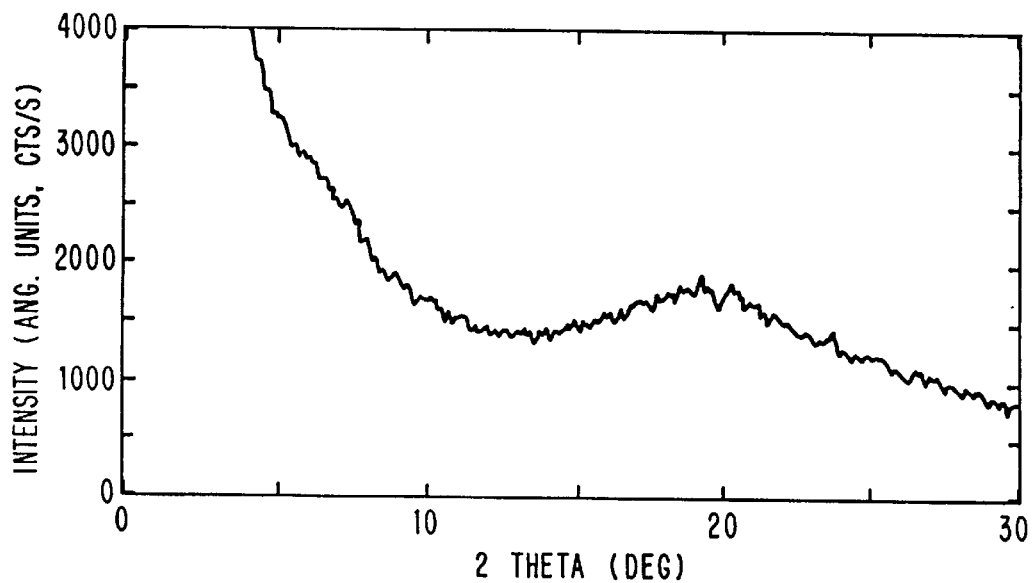
FIG. 7 is the wide angle X-ray spectrum of polyamic acid (uncured) using CuKa radiation.
Figure 8:
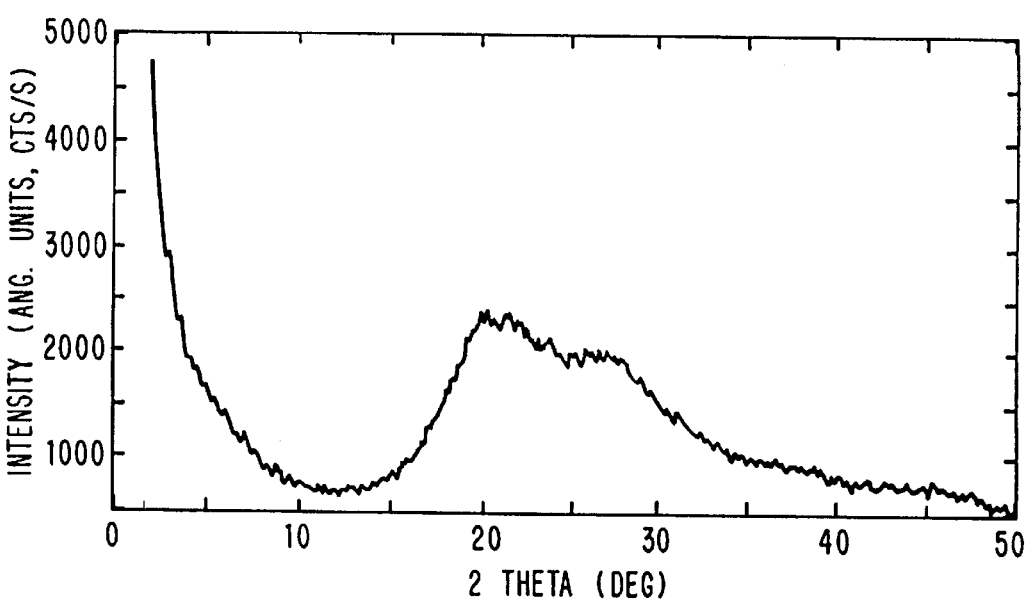
FIG. 8 is the wide angle X-ray spectrum of polyamic acid, polyaniline blend in a molar ratio of 1:05 after imidization of polyamic acid using $CuK^\alpha$ radiation.
Figure 9:
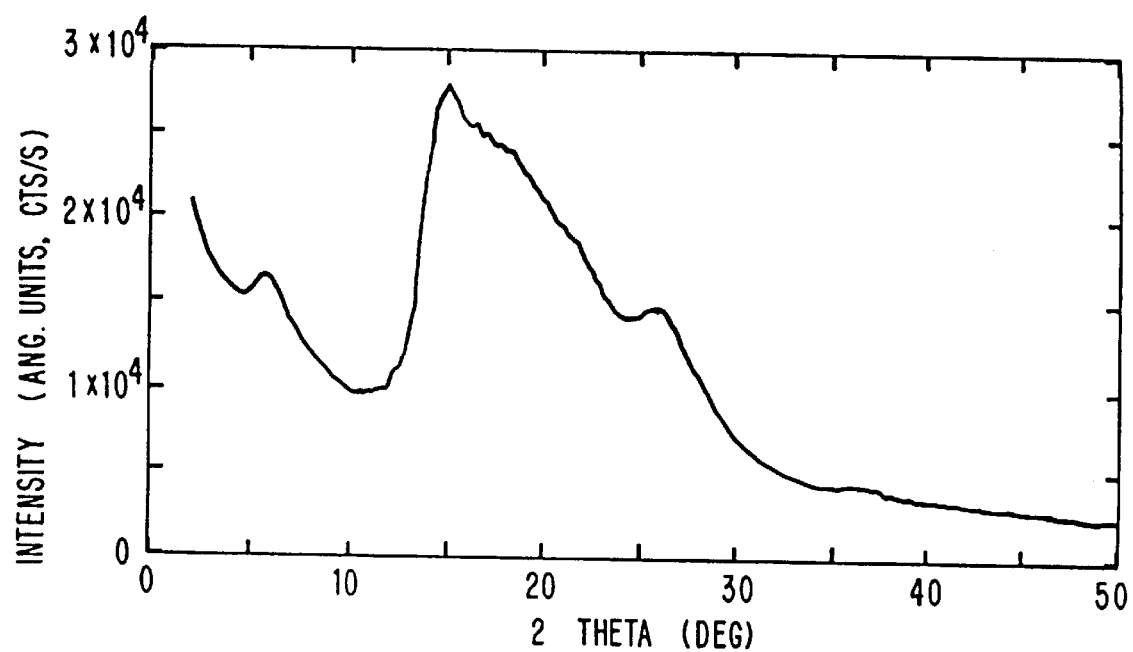
FIG. 9 is the wide angle X-ray spectrum of imidized polyamic acid (polyimide) using $CuK^\alpha$ radiation.

The disordered interchain packing of the polyaniline base corresponding to Bragg spacing of 4.1 A (FIG. 5) is suppressed, and a new scattering peak appears at 4.73 A for the PANI/PAA blend (FIG. 6). The change in the amorphous scattering to smaller angels implies the 'intercalation' of the PAA chains in PANI chains. FIG. 7 shows the WAXS scattering of pure PAA. Comparing FIGS. 6 and 7 indicates that the chains of PAA are also pushed apart. Comparison of FIG. 5. to FIG. 7 indicates that the PANI chain resides in the 'interstices' of the PAA chains. Comparing the WAXS spectra of imidized PANI/PAA (FIG. 8 and PAA (FIG. 9) clearly indicates the compatibility of the two polymers in the final cured, imidized state.

Figure 10:
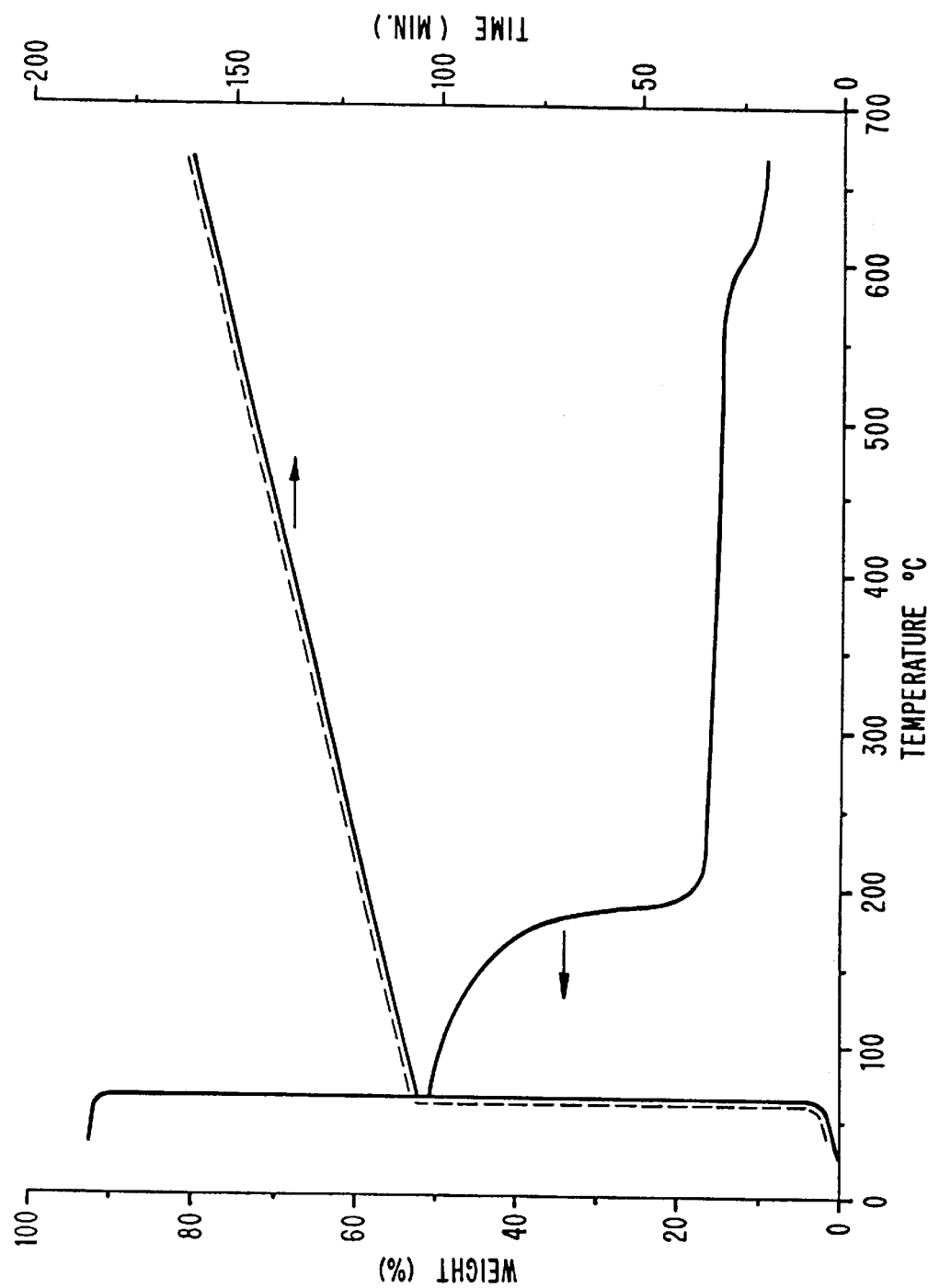
FIG. 10 is thermal gravimetric analysis (TGA) of polyamic acid from room temperature to 650° C. wherein the dotted line shows the thermal cycle the sample is subjected to e.g. time vs. temperature, and the solid line is the corresponding percent weight loss of the sample e.g. weight vs. temperature.
Figure 11:
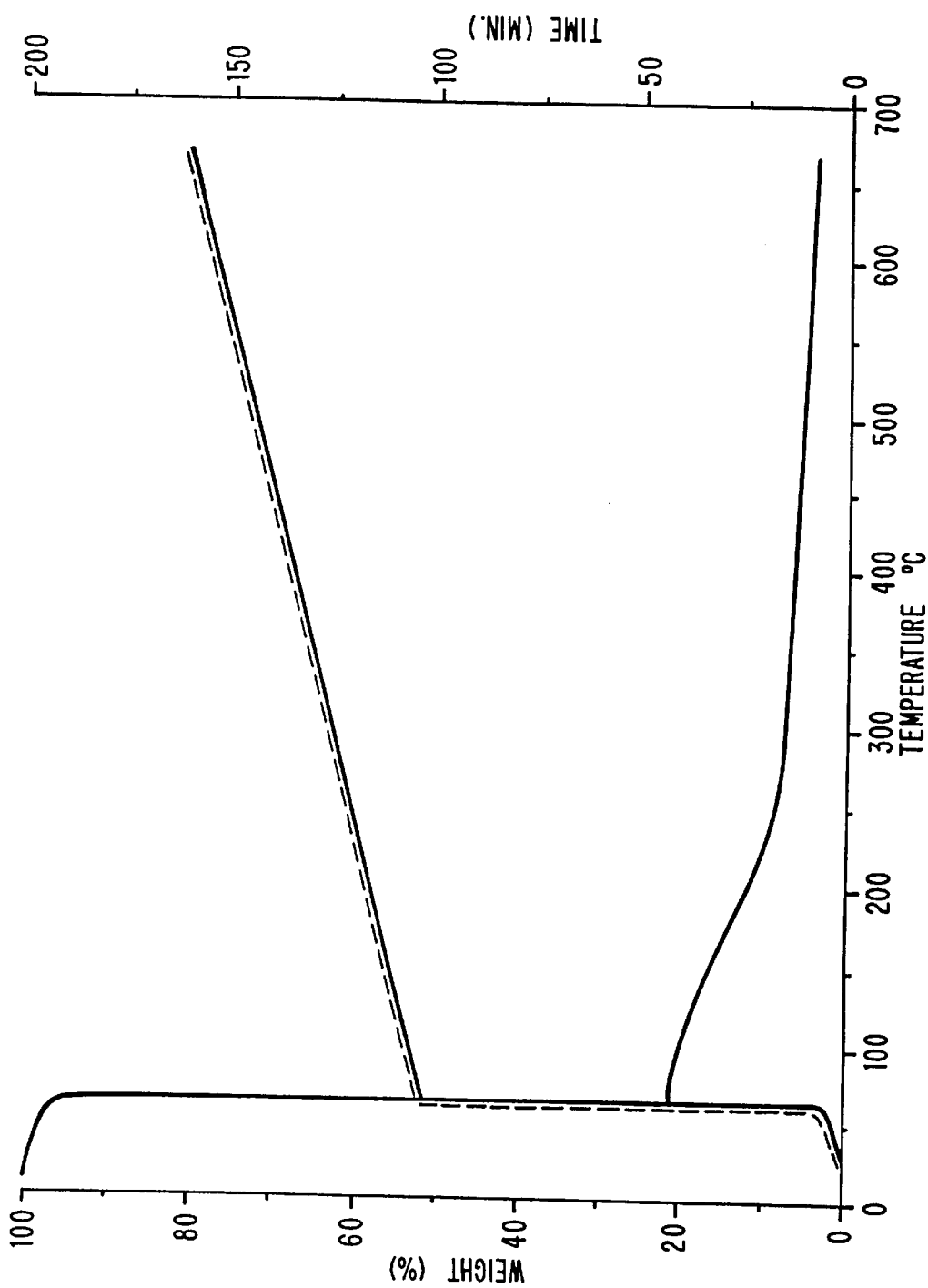
FIG. 11 is a thermal gravimetric analysis (TGA) of polyamic acid from room temperature to 650° C. wherein the dotted line shows the thermal cycle the sample is subjected to e.g. time vs. temperature, and the solid line is the corresponding percent weight loss of the sample e.g. weight vs. temperature.

The TGA-analysis indicates imidization occurs at a narrower temperature range in the polyamic acid alone (FIG. 10) whereas, the imidization process in PANI/PAA blend is spread over a broader range and also begins at a lower temperature than does the amic acid (FIG. 11). This indicates a dispersity in the chemical environment of the carboxylate group. The carboxylate groups which act as counteranions to doped PANI (PANI-H+) should imidize at lower temperatures than the groups bonded to H+.

The electrical, and mechanical performance of the blends may be tailored by the appropriate choice of molar ratio of PANI/PAA and also by the very nature of the specific polyamic acid utilized. The flexibility or rigidity of the polyamic acid backbone will affect the functional group spacing and thus the doping efficiency. The physical and mechanical properties of the polyamic acid and the resultant polyimide (Tg, modulus, etc.) will also tailor the properties of the final blend with the conducting polymer.

The polyaniline/polyamic acid solution readily forms a gel which can be processed by conventional gel spinning well known to those trained in the art. Gel spinning mat allow conductivity in chain direction to be increased.

With proper processing conditions, material composition and choice of dielectric and conducting polymer, the electrical, mechanical and thermal properties can be significantly enhanced compared to conventionally doped conducting polymers.

Possible application of such materials consist of applications requiring selective conducting/dielectric patterning and/or high anisotropic conductivities. Other applications include, thermally stable charge dissipators for E-Beam lithography, anti-static materials, and also material for EMI shielding.

EXAMPLE 2

Bisphenol-A-polycarbonate was dissolved in N-methylpyrrolidinone (NMP). Polyaniline and a thermal acid generator (in this case diethylamine triflate) were also dissolved in NMP. The two NMP solutions were mixed. The resulting 3-component solution was poured into a glass petri dish and heated to remove the solvent. During the evaporation the thermal acid generator is thermally decomposed to produce the free acid which in turn dopes the polyaniline. In this fashion free-standing conducting films were obtained. The conductivity obtained is dependent on the proportions of polyaniline and polycarbonate. Different levels of conductivity can thus be obtained which can be geared towards different applications by tailoring the proportions of the conducting polymer to the dielectric polymer.

EXAMPLE 3

This example discloses composites of various thermoplastics with conductive polyanilines and mentioned above which have resistivities of 0.5–2 ohm/cm and can be molded and machined without loss of conductivity and mechanical integrity. A low molecular weight polycarbonate (GE Lexan) (70 parts) was blended with 30 parts of polyaniline and 0.5 parts of Kenrich organotitanate coupling agent LICA KRTTS. The mixture was heated to melt temperature of the polycarbonate and roll milled to obtain a substantially homogeneous mixture. After extrusion to a rod shape it was machined to a pencil sharp edge. The resistivity of the composite rod was 0.5–0.6 ohm/cm. This was tested on the electronic notebook which gave satisfactory results.

What is claimed is:

1. A polymer blend composition, capable of being made electrically conductive by application of heat thereto, comprising an electrically conductive upon doping, polymer in undoped form, wherein said undoped polymer is selected from the group consisting of substituted and unsubstituted polyparaphenylenevinylenes, polyanilines, polyazines, polythiophenes, poly-p-phenylene sulfides, polyfuranes, polyselenophenes, polyacetylenes formed from soluble precursors and combinations and blends thereof, compounded and blended of a molecular scale with a dielectric polymer, wherein said dielectric polymer is selected from the group consisting of interpolymers of acrylonitrile-butadiene-styrene, acetal acrylic liquid crystal polymers, polybutylene terephthalate, polycarbonate, polyester, polyetherimide, polyethersulfone, polyethylene, polyethylene terephthalate, polyphenylene oxide, polyphenylene sulfide, polypropylene, polystyrene, polyurethane, polyvinylchloride, styrene-acrylonitrile copolymer, fluoropolymers, nylon polyesters, and thermoplastic elastomers, and a thermally deblockable dopant selected from the group consisting of triflates, tosylates and borates, said electrically, upon doping, polymer having conductive enhanced solubility in undoped form with said dielectric polymer to form a compatible molecularly mixed blend in solution and doping of said undoped polymer to reader of conduction occurring only after exposure to heat.

2. The electrically conducting polymer blend composition defined in claim 1 wherein said triflates, tosylates and borates are selected from the group consisting of $CF_3SO_3H \cdot NC_5H_5$, $CF_3SO_3H \cdot NH_3$, $CF_3SO_3H \cdot CH_3NHC$, $CF_3SO_3H \cdot (CH_3)_3N$, $CF_3SO_3H \cdot C_2H_5NH_2$, $CF_3SO_3H \cdot (C_2H_5)_2NH$, $CF_3SO_3H \cdot (C_2H_5)_3N$, $CF_3SO_3H \cdot (i-C_3H_7)_2NH$, $CF_3SO_3H \cdot (i-C_3H_7)_2N(C_2H_5)$, $CF_3SO_3H \cdot (i-C_3H_7)_2N(C_2H_4OH)$, $CF_3SO_3H \cdot H_2N(C_2H_4OH)$, $CF_3SO_3H \cdot HNC_4H_8O$, $CF_3SO_3H \cdot H_2NC(CH_3)_2CH_2OH$, $CF_3S_3H \cdot HNC_5H_{10}$, $CF_3SO_3H \cdot HN(C_2H_4OH)_2$, $BF_3C_2H_5NH_2$, $CF_3SO_3(CH_3)_4N$, $H_3C(C_6H_4)SO_3H$.

3. The polymer blend composition defined in claim 1 wherein said dielectric polymer is selected from the group consisting of interpolymers of acrylonitrile-butadiene-styrene, acetal acrylic liquid crystal polymers, polybutylene terephthalate, polycarbonate, polyester, polyetherimide, polyethersulfone, polyethylene, polyethylene terephthalate, polyphenylene oxide, polyphenylene sulfide, polypropylene, polystyrene, polyurethane, polyvinyl chloride, styrene-acrylonitrile copolymer and thermoplastic elastomer; and said thermally deblockable dopants are selected from the group consisting of $CF_3SO_3H \cdot NC_5H_5$, $CF_3SO_3H \cdot NH_3$, $CF_3SO_3H \cdot CH_3NHC$, $CF_3SO_3H \cdot (CH_3)_3N$, $CF_3SO_3H \cdot C_2H_5NH_2$, $CF_3SO_3H \cdot (C_2H_5)_2NH$, $CF_3SO_3H \cdot (C_2H_5)_3N$, $CF_3SO_3H \cdot (i-C_3H_7)_2NH$, $CF_3SO_3H \cdot (i-C_3H_7)_2N(C_2H_5)$, $CF_3SO_3H \cdot (i-C_3H_7)_2N(C_2H_4OH)$, $CF_3SO_3H \cdot H_2N(C_2H_4OH)$, $CF_3SO_3H \cdot HNC_4H_8O$, $CF_3SO_3H \cdot H_2NC(CH_3)_2CH_2 \cdot OH$, $CF_3SO_3H \cdot HNC_5H_{10}$, $CF_3SO_3H \cdot HN(C_2H_4OH)_2$, $BF_3C_2H_5NH_2$, $CF_3SO_3(CH_3)_4N$, $H_3C(C_6H_4)SO_3H$.

4. The polymer blend composition defined in claim 3 wherein said electrically undoped polymer is polyaniline, said dielectric polymer is polycarbonate and said thermally deblockable dopant is diethylamine triflate.

5. The polymer blend composition defined in claim 3 wherein the undoped polymer is polythiophene, said dielectric polymer is nylon polyener and said thermally deblockable dopant is $CF_3SO_3H \cdot H_2N(C_2H_4OH)$.

* * * * *